(12) United States Patent
Newman

(10) Patent No.: US 10,432,024 B2
(45) Date of Patent: Oct. 1, 2019

(54) SPLIT-PHASE HIGH-EFFICIENCY REACTIVE ENHANCED ACTIVE TRANSDUCER

(71) Applicant: Joshua Hershel Newman, Jerusalem (IL)

(72) Inventor: Joshua Hershel Newman, Jerusalem (IL)

( * ) Notice: Subject to any disclaimer, the term of this patent is extended or adjusted under 35 U.S.C. 154(b) by 81 days.

(21) Appl. No.: 15/568,576

(22) PCT Filed: Jun. 19, 2016

(86) PCT No.: PCT/IL2016/050646
§ 371 (c)(1),
(2) Date: Oct. 23, 2017

(87) PCT Pub. No.: WO2016/207878
PCT Pub. Date: Dec. 29, 2016

(65) Prior Publication Data
US 2018/0123393 A1    May 3, 2018

Related U.S. Application Data

(60) Provisional application No. 62/183,344, filed on Jun. 23, 2015.

(51) Int. Cl.
| | | |
|---|---|---|
| *H02J 50/10* | (2016.01) | |
| *H02M 7/06* | (2006.01) | |
| *H02M 7/08* | (2006.01) | |
| *H02M 7/217* | (2006.01) | |
| *H04B 5/00* | (2006.01) | |
| *H02J 50/00* | (2016.01) | |

(52) U.S. Cl.
CPC ............. *H02J 50/10* (2016.02); *H02M 7/064* (2013.01); *H02M 7/08* (2013.01); *H02M 7/2173* (2013.01); *H04B 5/0037* (2013.01); *H04B 5/0087* (2013.01); *H02J 50/00* (2016.02)

(58) Field of Classification Search
CPC ........ H02J 50/10; H02J 50/00; H04B 5/0087; H04B 5/0037; H02M 7/2173; H02M 7/064; H02M 7/08
See application file for complete search history.

(56) References Cited

U.S. PATENT DOCUMENTS 4,518,941 A     5/1985   Harada
4,706,274 A  *  11/1987  Baker ............... H04M 1/72513
                                                    379/160
(Continued)

OTHER PUBLICATIONS

Zhao, et al., "A radio-frequency energy harvesting scheme for use in low-power ad hoc distributed networks", IEEE Transactions on Circuits and Systems II: Express Briefs, Aug. 10, 2012, pp. 573-577, 59(9).

(Continued)

*Primary Examiner* — Naum Levin
(74) *Attorney, Agent, or Firm* — The Roy Gross Law Firm, LLC; Roy Gross

(57) ABSTRACT

An energy harvesting circuit is provided that consists of two parallel paths, each comprising a transformer, full wave rectifier, and capacitor. An ultra-low-power microcontroller operates a double-position double-throw switch, which switches the capacitors from charging from the input, to providing energy to the output.

9 Claims, 3 Drawing Sheets

(56) References Cited

U.S. PATENT DOCUMENTS

| | | | | |
|---|---|---|---|---|
| 5,895,983 | A * | 4/1999 | Motomura | H02M 3/33569 |
| | | | | 307/106 |
| 6,037,743 | A | 3/2000 | White et al. | |
| 6,707,284 | B2 * | 3/2004 | Lanni | G06F 1/26 |
| | | | | 323/297 |
| 6,917,124 | B2 * | 7/2005 | Shetler, Jr. | H02J 9/061 |
| | | | | 307/66 |
| 6,952,355 | B2 * | 10/2005 | Riggio | H02M 1/4225 |
| | | | | 363/21.15 |
| 7,084,605 | B2 | 8/2006 | Mickle et al. | |
| 8,531,153 | B2 | 9/2013 | Baarman et al. | |
| 9,077,052 | B2 * | 7/2015 | Reddy | H01M 10/44 |
| 9,839,103 | B2 * | 12/2017 | Avrahamy | C02F 1/42 |
| 2006/0164866 | A1 | 7/2006 | Vanderelli et al. | |
| 2008/0054961 | A1 | 3/2008 | Rasaratnam | |
| 2008/0164838 | A1 | 7/2008 | Maher | |
| 2012/0206096 | A1 | 8/2012 | John | |
| 2016/0190868 | A1 * | 6/2016 | Shao | H02J 17/00 |
| | | | | 307/149 |

OTHER PUBLICATIONS

A Cost-Effective System for Wireless Power Transmission. PhD diss., University of Kerala, 2011.

International Search Report Application No. PCT/IL2016/050646 dated Sep. 26, 2016; mailed Sep. 29, 2016 8 pages.

Written Opinion of the International Searching Authority Application No. PCT/IL2016/050646 dated Sep. 29, 2016 5 pages.

Dinae L-Damak et al.: A 93% efficiency reconfigurable switched-capacitor DC-DC converter using on-chip ferroelectric capacitors, Solid-State Circuits Conference Digest of Technical Papers (ISSCC), 2013 IEEE International, IEEE, Feb. 17, 2013, pp. 374-375.

Chong-Yi Liou et al: High-Power and High-Efficiency RF Rectifiers Using Series and Parallel Power-Dividing Networks and Their Applications to Wirelessly Powered Devices, IEEE Transactions on Microwave Theory and Techniques, Plenum, USA, vol. 61, No. 1, Dec. 20, 2012, pp. 616-624.

Hsieh Ping-Hsuan et al.: An RF Energy Harvester with 44.1% PCE at Input Available Power of—12 dBm, IEEE Transactions on Circuits and Systems I: Regular Papers, IEEE, US, vol. 62, No. 6, May 25, 2015, pp. 1528-1537.

European Search Report, dated Jun. 1, 2018, 13 pages.

* cited by examiner

SPLIT-PHASE HIGH-EFFICIENCY REACTIVE ENHANCED ACTIVE TRANSDUCER

This application is a National Phase of PCT Patent Application No. PCT/IL2016/050646 having International filing date of Jun. 19, 2016, which claims the benefit of priority of U.S. Provisional Application No. 62/183,344 filed on Jun. 23, 2015. The contents of the above applications are all incorporated by reference as if fully set forth herein in their entirety.

FIELD OF THE INVENTION

The present invention relates generally to the field of wireless energy harvesting devices. More specifically, relates to the field of split-phased AC-DC transducer devices for energy harvesting by split phased antennas.

BACKGROUND OF THE INVENTION

The increasing crowding of the electromagnetic spectrum as well as increased power demands of mobile devices both spur interest in wireless energy harvesting.

Typical energy harvesting devices are comprised of an antenna which induces AC current from gathered ambient EM radiation, and an AC-DC converter which converts the AC current to usable DC current. Simple energy harvesting devices have a simple rectifier and an antenna; combined, the devices are called rectennas (rectifier-antenna).

While dealing with low voltage values that are induced from a typical dipole antenna, a simple diode, is often sufficient for a safely operational harvesting device. Nevertheless, where a significantly more potent antenna such as a split phase flattened-torus antenna is used, there is a need for more complex rectifiers that as unneeded by-product often have larger dimensions due to increased usage of durable components.

It is obvious to one of average skill in the art that while a simple diode rectifier is enough when dealing with perhaps tens of millivolts and several milliamps of voltage a simple antenna, the same device, may not possibly endure a split phase flattened-torus antenna or other potent antennas with tens of volts and a hundred or more milliamps of voltage output.

Designing a compact transducer comprised of relatively few and light components for converting tens of volts AC to the 5V DC voltage and one-hundred or more milliamps that is suitable for charging mobile devices such as phones and tablets, is not an easy task.

A person of average skill in the art will face several difficulties while trying to achieve such a design.

Due to the split phase antenna used in conjunction with the transducer, and due to the relatively high voltage derived thereof, advisable is a parallel rectifier configuration to reduce the load on each rectifier.

In addition, due to the pulse nature of antenna derived current, there is a need for a capacitor to smooth the current for suiting sensitive mobile devices. The addition of a capacitor is problematic because suddenly disconnecting a capacitor from the source in order to connect it to the load may result in a massive spike in voltage (flyback) which may cause the device to explode or otherwise damage components.

Furthermore, where the device dimensions are limited, such high power as is expected from potent antennas, is catastrophic to the device components (diodes and capacitors). There is a need for a device that has a combination of components which enables the following characteristics:

A) compact device dimensions;
B) endurance of high AC power input from a split phase source;
C) the flyback effect resulted from the split phase configuration is prevented;
D) smooth DC voltage output suitable for mobile devices, typically 5V at 100 or more milliamps DC;

SUMMARY OF THE INVENTION

The invention consists of a novel AC-DC transducer intended to be fed by a split-phase antenna that induces high voltage from ambient EM energy, or other split phase voltage sources.

The AC-DC transducer in a split phase configuration for converting high AC voltage to low DC voltage, where each phase comprises:

A) a step-down transformer connected to each phase of a split phased antenna, with center-tapped primary and multiple secondaries, for reducing the AC voltage while increasing the current;
B) a full wave rectifier connected to each secondary (for each phase) of said transformer for converting the AC voltage to DC voltage. Wherein the full wave rectifier is preferably characterized as lightweight, having a fast turnaround rate, having a low voltage-drop, and composed of minimal parts.

wherein, the transducer further comprises:

C) at least two capacitors for storing the aggregated energy from the antenna, wherein, one capacitor is connected to the source for recharging while the other capacitor is connected to the load providing smooth power supply thereto;
D) a double-position double-throw switch for eliminating flyback while switching the capacitors. The double-position double-throw switch enables drawing power from one capacitor connected to the load, while charging the other capacitor connected to the source. When the first capacitor depletes, said switch will then connect the depleted capacitor to the source while connecting the fuller capacitor the load;
E) a means for operation of the double-position double-throw switch, including but not limited to (a) component(s) such as an ultra-low-power microcontroller for the operation of the double-position double-throw switch.

wherein said primary of said transformer is connected to points on a split phased voltage source that are at largely opposite points of the voltage waveform impressed thereupon.

For the purposes of the exemplary embodiment disclosed herein, an ultra-low-power microcontroller is described in this capacity Alternative combinations of components and methods may be substituted or added for this purpose as would become apparent to one skilled in the art after studying the present disclosure, despite not being described herein for the sake of brevity;

The transducer may further comprise a voltage sensing feedback network, for example, comprising a resistor divider connected to the microcontroller.

Alternative combinations of components and methods may be substituted or added for this purpose as would become apparent to one skilled in the art after studying the present disclosure, despite not being described herein for the sake of brevity; and The transducer may further comprise DC-DC converter/regulator for further regulating the DC voltage for the a specified Voltage;

It is within the provision of the invention that the step down transformer is a magnetic saturation reactor transformer, capable of operation at a plurality of appropriate frequencies.

The magnetic saturation reactor transformer [MSRC] is uniquely advantageous in this application, due to its ability to transform, amplify and regulate the AC output when configured appropriately with for feedback and control, as is well-known to one with ordinary skill in the art. Furthermore, an MSRC is a robust, efficient device, which when properly configured produces little to no heat relative to other transformer methodologies.

A general-purpose MSRC would typically be inadequate for this application due to size and weight of the core, and inadequate operation at above several hundred kilohertz frequency. However, a solution to this limitation was found by adapting miniature magnetic pulse-transformers, that when configured according to the unique methodology herein, are capable of outstanding performance as needed as well as being extremely small in size and weight. Furthermore, the MSRC by its nature impedance-matches the split-phase antenna to the rectifiers for more efficient power transfer, in addition to providing large currents upon collapse of its energy stored in its magnetic field (being switched by the rectification action of the diodes attached to its outputs).

Finally, the split-phase inputs to the MSRC prevent undesirable over-saturation by the effect of polarity-reversal thereby increasing the power throughput and lowering losses, as is known to those skilled in the art.

It is within the provision of the invention that the full wave rectifier is comprised of high voltage resistant and fast switching diodes such as 1n5711 diodes, or other components capable of achieving the similar or superior operational performance. As mentioned above, the disclosed method for connecting the full wave rectifiers maximally exploits the advantages of the MSRC and allows maximally efficient rectification.

The present invention discloses a combination of components that enables the following characteristics:

a) compact device dimensions;

b) endurance of high AC voltage input from a split phase source;

c) the flyback effect resulted from the split phase configuration is prevented;

d) smooth voltage output suitable for mobile devices;

e) high-efficiency MSRC for transforming, amplifying and regulating the AC when connected and configured as disclosed, including resonantly, inductively, electromagnetically and electrostatically/electrodynamically, increasing performance by up to orders of magnitude compared to other common methods.

It should be mentioned that only by extensive experimentation, the exact combination and configuration of components of the device of the present invention were implemented. It is only through the present specification, that the unique advantages of the present invention may be achieved. The present invention is therefore surprising and not obvious for one skilled in the art.

The foregoing embodiments of the invention have been described and illustrated in conjunction with systems and methods thereof, which are meant to be merely illustrative, and not limiting. Furthermore just as every particular reference may embody particular methods/systems, yet not require such, ultimately such teaching is meant for all expressions notwithstanding the use of particular embodiments.

BRIEF DESCRIPTION OF THE DRAWINGS

Embodiments and features of the present invention are described herein in conjunction with the following drawings.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

Figure 1:
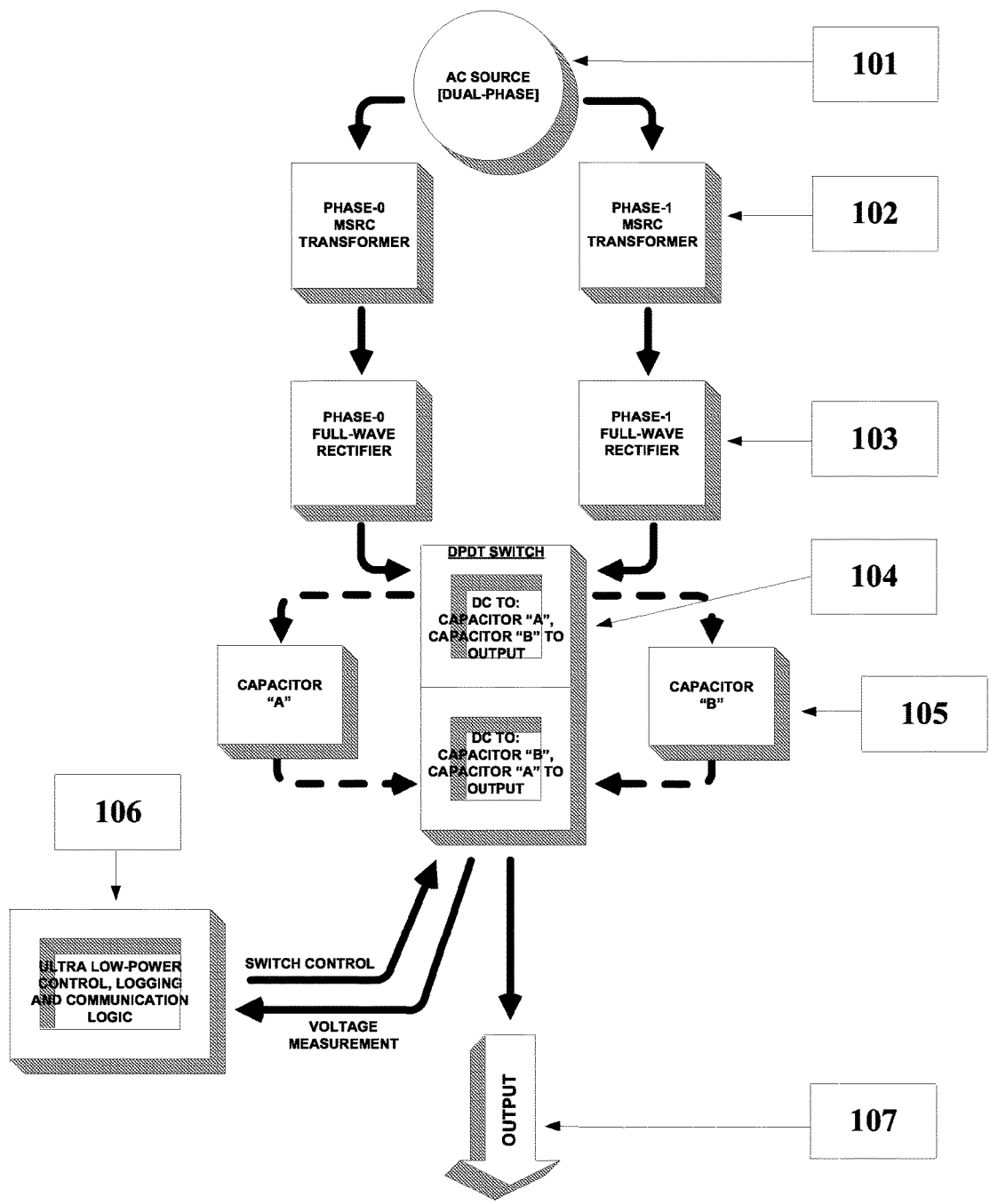
FIG. 1 shows a block diagram of one embodiment of the invention.

As seen in FIG. 1, the energy harvesting circuit starts with an AC source such as a split phase antenna [101]. The next stages consist of two parallel paths, each comprising a transformer [102], and a full wave rectifier [103].

An ultra-low-power microcontroller [106] operates a double-position double-throw switch [104], which switches the capacitors [105] from charging from the input, to providing energy to the output [107].

The use of two parallel paths allows for several improvements over the prior art. First of all, the energy is harvested at both positive and negative points of the waveform, at a given time; the inputs are located at points of the antenna that are at opposite points of the impressed waveform from passing electromagnetic waves. This supplies each half of a split full wave rectifier with each phase, consisting of opposite polarities (180 degrees out of phase), allowing the maximum potential differential at all times between the DC positive and negative outputs.

Secondly, by splitting the circuit into two parallel paths, the load on each capacitor is halved, and one can be charged while the other discharges. The charging and discharging of the circuit is controlled by means of MCU [106], which also serves to measure the output voltages of the capacitor. Based on this voltage, the capacitors may be switched into and out of connection with the input and output; for instance, when the output capacitor drops below a given threshold voltage, it may be taken out of connection from the output and connected to the input, to charge again, while the input capacitor is simultaneously connected to the output to continue providing energy to whatever load may be connected to the output.

Figure 2:
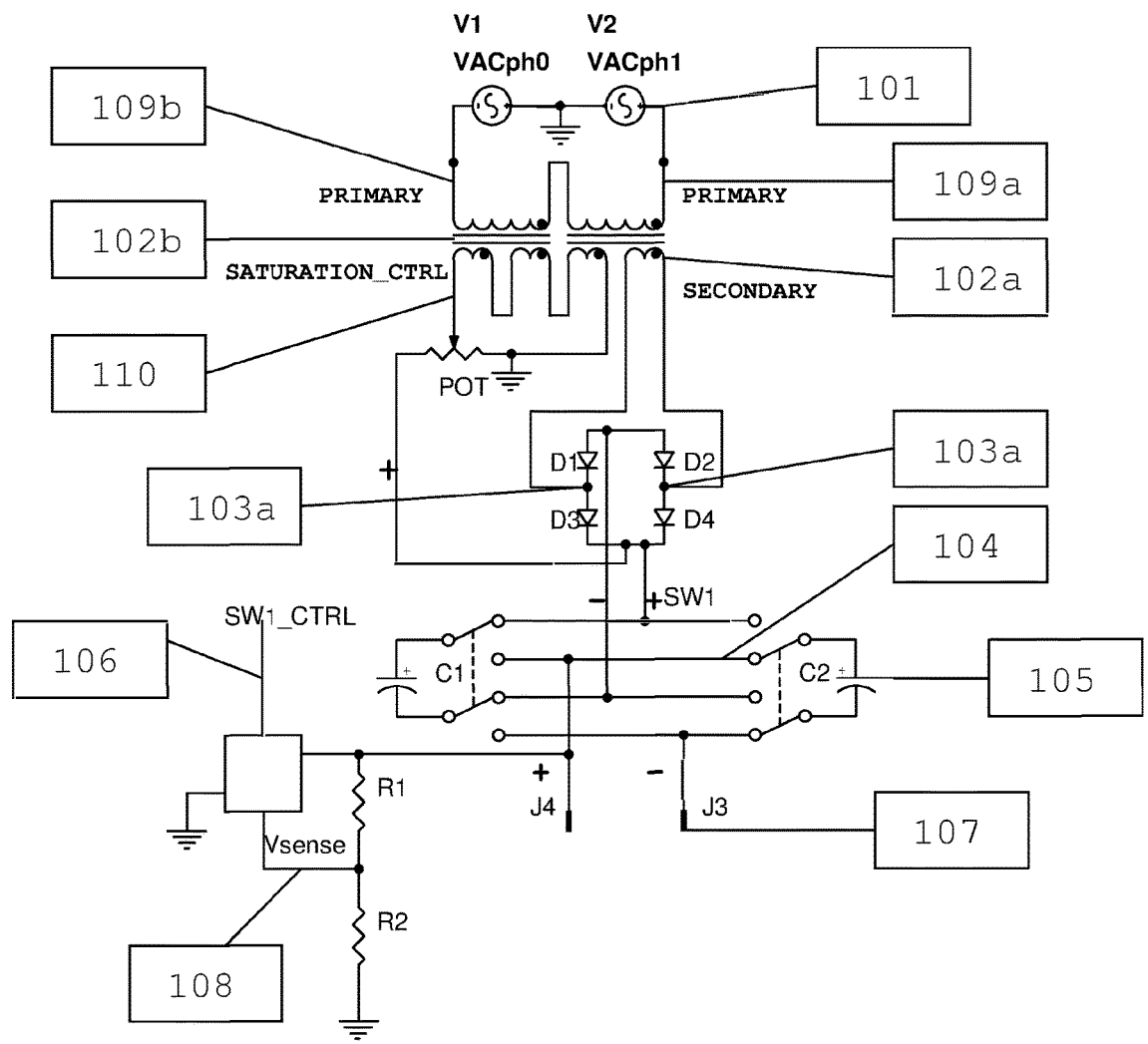
FIG. 2 shows an electrical schematic of one embodiment of the invention.

FIG. 2 shows a detailed schematic of one possible embodiment of the energy harvesting circuit of the invention. Here one sees that the transformer primaries may be implemented as separate coils on a single core [109a,b], while the secondaries may be taps on a single coil on the same core [110]. An appropriately configured double-position double-throw switch is used to switch the capacitors into and out of contact with the charging circuit and the load, by means of the microcontroller. The feedback mechanism consists of a resistor divider [108] (or alternatively, a single-chip component for this purpose) which senses a fraction of the voltage at the output, to enable the measurement thereof and switching action accordingly by the microcontroller.

Figure 3:
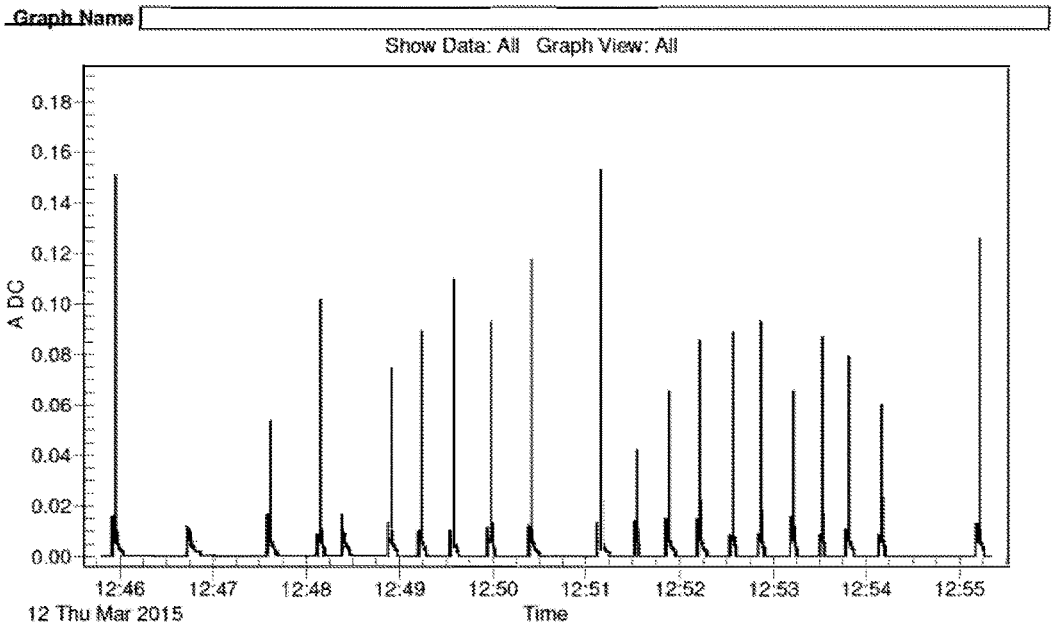
FIG. 3 shows is a screenshot of a software for DC current logging of an embodiment of the present invention.

FIG. 3 shows an example of DC amperage readings over time obtained from one implementation of the invention, at DC 13.5 Volts, after rectification but before undergoing DC-DC conversion to 5V DC.

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

The invention claimed is:

1. An AC-DC transducer for converting AC voltage to DC voltage, the AC-DC transducer having two parallel phases where each phase comprises:
   a. a step-down transformer [102] which is a miniature magnetic pulse-transformer connected to each phase of a split phased antenna, comprising a center-tapped primary and a plurality of secondaries;
   b. a full wave rectifier [103] connected to said step-down transformer [102] for converting the AC voltage to DC voltage;
the AC-DC transducer further comprises:
   c. at least two capacitors [105], for storing aggregated energy from said split-phased antenna, wherein, a first of said at least two capacitors is connected to a source for recharging while a second of said at least two capacitors is connected to a load providing smooth power supply thereto;
   d. a double-position double-throw switch [104] for eliminating flyback and switching said at least two capacitors alternatively between the load and the source;
   e. a means of operation [106] of said double-position double-throw switch;
wherein said primary of said a step-down transformer [102] is connected to points on a split phased source [101] that are at largely opposite points of a voltage waveform impressed thereupon.

2. The device of claim 1 wherein, said full wave rectifier [103] is comprised of a high voltage resistant and fast switching diode.

3. The device of claim 1 wherein, said full wave rectifier [103] is comprised of a 1n5711 diode.

4. The device of claim 1 wherein, said means of operation [106] is a microcontroller.

5. The device of claim 1 further comprising a DC-DC converter for regulating the DC voltage for a specified voltage.

6. The device of claim 1 further comprising a voltage sensing feedback network [108] comprising a resistor divider connected to said microcontroller.

7. The device of claim 1 wherein, said primaries are separate coils on a single core [109a,b] of said transformer; wherein, said secondaries are taps on a single coil on said core [110].

8. A method for using the double-position double-throw switch [104] of claim 1:
   a. upon depletion of a load connected capacitor;
   b. disconnecting a first depleted capacitor from the load and a second capacitor from the source;
   c. connecting the depleted capacitor to the source and connecting the other capacitor the load.

9. The method of claim 8 wherein, the double-position double-throw switch [104] switches said capacitors simultaneously.

* * * * *